United States Patent
Stelzer et al.

(10) Patent No.: US 7,709,998 B2
(45) Date of Patent: May 4, 2010

(54) MEASUREMENT SYSTEM FOR MEASURING CYLINDER PRESSURE IN AN INTERNAL COMBUSTION ENGINE

(75) Inventors: Andreas Stelzer, Linz (AT); Robert Hauser, Bodensdorf (AT); Stefan Schuster, Linz (AT); Stefan Scheiblhofer, Linz (AT); Klaus Leitmeier, Graz (AT)

(73) Assignee: AVL List GmbH, Graz (AT)

( * ) Notice: Subject to any disclaimer, the term of this patent is extended or adjusted under 35 U.S.C. 154(b) by 169 days.

(21) Appl. No.: 11/918,736

(22) PCT Filed: Apr. 20, 2006

(86) PCT No.: PCT/AT2006/000160

§ 371 (c)(1),
(2), (4) Date: Jun. 9, 2008

(87) PCT Pub. No.: WO2006/110935

PCT Pub. Date: Oct. 26, 2006

(65) Prior Publication Data

US 2009/0072671 A1    Mar. 19, 2009

(30) Foreign Application Priority Data

Apr. 21, 2005  (AT) .............................. GM249/2005

(51) Int. Cl.
*H01L 41/107* (2006.01)
(52) U.S. Cl. ........................................................ 310/319
(58) Field of Classification Search ................ 310/319, 310/338
See application file for complete search history.

(56) References Cited

U.S. PATENT DOCUMENTS

| 4,586,382 | A | * | 5/1986 | Sinha .......................... 73/703 |
| 5,062,294 | A | | 11/1991 | Iwata |
| 5,220,836 | A | | 6/1993 | Harms et al. |
| 2003/0069713 | A1 | | 4/2003 | Friedl et al. |

FOREIGN PATENT DOCUMENTS

| DE | 4210818 | 10/1993 |
| WO | 2005095895 | 10/2005 |

OTHER PUBLICATIONS

English Abstract of DE 4210818.

* cited by examiner

*Primary Examiner*—Thomas M Dougherty
(74) *Attorney, Agent, or Firm*—Dykema Gossett PLLC

(57) ABSTRACT

A plurality of exchangeable, different piezoelectric pressure sensors (4) comprise integrated SAW elements (60) as identification units whose identification data can be read by an interrogation unit (3) via a common connection cable (61). The analysis unit (2) for the measurement signals and the interrogation unit (3) for the identification data can be connected by a common coupling unit (5) to the connection cable (61). The coupling unit (5) has a coupling capacity (6) which connects with high frequency the interrogation unit (3) to the signal line of the connection cable (61), as well as a coupling inductance (7) which connects with low frequency the load amplifier (1) of the analysis unit (2) to the connection cable (61), thus neatly separating the useful signal from the identification signal and keeping a high-impedance measurement chain from the sensor (4) to the input of the load amplifier (1). An SFSCW radar can further be used to improve interrogation of the identification data.

2 Claims, 1 Drawing Sheet

Figure 1:
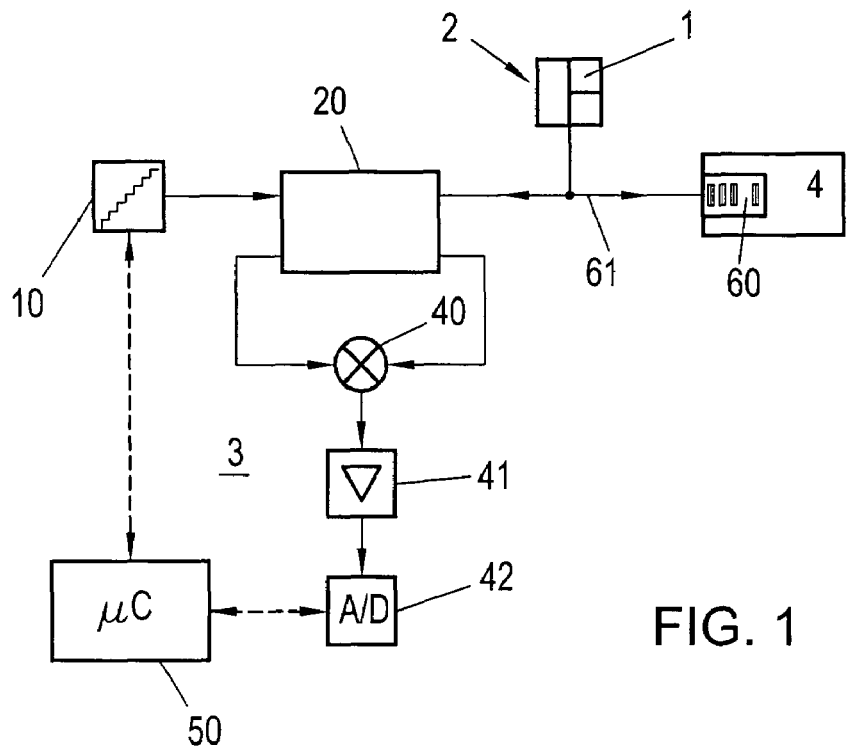

MEASUREMENT SYSTEM FOR MEASURING CYLINDER PRESSURE IN AN INTERNAL COMBUSTION ENGINE

The invention relates to a measurement system in internal combustion engines comprising a plurality of exchangeable piezoelectric pressure sensors which are different in their measuring characteristic and which are connected during operation via a connection cable to an analysis unit provided with an load amplifier and whereby said pressure sensors are provided with integrated identification units having SAW (surface acoustic wave) elements with identification units whose identification data can be read by an interrogation unit via the connection cable and whereby said interrogation unit contains an FSCW (frequency stepped continuous waver) radar unit.

Measurement systems of the aforementioned type are basically disclosed in AT 5.042 U2, for example, and have the advantage that the storage of partly very extensive sensor-relevant data can be stored away from the direct vicinity of the sensor with its high temperatures, vibrations and other interferences whereby only one identification unit with only a small number of identification data remains in or on the sensor, for example, with one identification sensor identification unit on the sensor itself having sensor recognition that can be correlated with the storage unit for sensor-relevant data. This small amount of identification data (e.g. a simple binary code) with its non-critical, simple and non-critical elements can be stored even in hostile ambient conditions and said data remains firmly connected with the sensor in a physical manner while any other sensor-related data (such as sensitivity curves, calibration data and the like) are present in the external storage unit whereby only examination of simple sensor recognition relative to association is necessary to ensure the close relationship of sensor unit and sensor.

The design of the identification unit on the sensor can also have known SAW elements as mentioned in the beginning aside from the different simple design of the identification unit on the sensor as discussed also in the cited AT 5.042 U2. The use of surface acoustic wave (SAW) elements used as sensors and/or identification marks have been known for quite some time. Newer documents (Bruckner et al, Orc, 2003 IEEE Freq. Contr. Symp., 942 ff) have shown that such systems are especially suitable to be installed into existing technical systems as ID tags and/or for monitoring of physical or chemical parameters. It is thereby especially advantageous that such systems can be operated completely passive, which means no energy supply is needed as, for example, a battery in the region of the ID tag or the sensor. In addition, SAW elements are thermally and mechanically robust and they can be greatly reduced to miniature size and they can also be adapted in form and design for specific applications.

For example, the suitability of a SAW system has been demonstrated for installation into a passive interrogatable ID tag in capacitive inner-cylinder pressure sensors. SAW elements are thereby able to function dependably over lengthy periods even at high temperatures and vibrations. Analog uses for other passive systems to be monitored or to be identified are possible. For example, the use of SAW elements to detect physical values is also possible, such as temperature, magnetic field forces and/or chemical parameters, e.g. thermal decomposition.

All such uses have in common that the SAW system represents the completion of an existing system. This means that the entire SAW system is to be integrated into the host system whereby the entire SAW system consists of a transmitting/receiving unit ("SAW reading device") and the actual SAW element(s), in the rule without changes to the electric or installation/construction characteristics of the system to be monitored. Because of these limitations it is not possible in many employments to design the system optimally for operation of a SAW element in an operation requiring transmission of high frequency signals (HF signals). This limited or lacking possibility of adaptation is a problem since the use of HF signals required for SAW operation—in the MHz-GHz range in this case—results in interfering reflections in a system that is not adapted for this purpose and whereby said interfering reflections can be several times greater than the useful signal to be detected. Such interferences are in the rule prohibitive for the use of simple cost-effective SAW reading devices. At the same time there is not only this requirement, which is avoiding the problem through employment of more complex SAW reading devices, and there is not only the requirement to integrate this unit as well, which often times is not possible because of the typically larger structural size, but there is also the requirement to keep especially the (total) costs as low as possible.

Especially critical is also the requirement that the measuring sequence from the piezoelectric element up to the input of the load amplifier must be held at high ohms (typically in the range of $10^{14}$ Ohm), which means also the connection of the piezoelectric pressure sensor itself, selected for handling purposes, to the integrated identification unit via a common connection cable, and measurements cannot be very accurate over longer time intervals since drift occurrences would lead with certainty to faulty measurements. The coupling of the SAW reading device and the load amplifier to the common signal line of the connection cable is therefore very important.

It is the object of the present invention to improve the measurement system of the aforementioned type in such a manner that the required coupling of the SAW reading device and the load amplifier to the common signal line meets the cited requirements for the entire measuring sequence to be able to make measurements with the used sensors in accurate manner and over longer time intervals as well.

This object is achieved according to the present invention in that the analysis unit and the interrogation unit can be connected by a common coupling unit to the connection cable and whereby the coupling unit has a coupling capacity and a coupling inductivity which can be connected parallel to the signal line of the connection cable, whereby the interrogation unit is coupled with high frequency to the signal line of the connection cable, while the load amplifier of the analysis unit is coupled with low frequency by means of the coupling inductivity to the signal line of the connection cable. This coupling unit serves thereby, at the one hand, to separate the useful signal of the pressure sensor from the identification signal of the integrated identification unit and, on the other hand, to maintain the high ohmic characteristics of the measuring sequence between the piezoelectric pressure sensor and the load amplifier input, whereby restrictions of the measuring characteristics of the sensors are avoided and, at the same time, the described identification of the sensors is kept possible in a simple manner As already discussed above, a problem exists with this combined measuring and identification process in that the entire system cannot be designed at all or at least not optimally for the operation of the SAW elements performing the transmission of high frequency signals, whereby interference signals originating from the reflections can often times be greater in large measures than the useful signals intended for the detection in the identification process. An additional embodiment of the invention is especially advantageous in this context wherein a generally known SFSCW (switched frequency stepping continuous wave) radar unit is arranged in the interrogation unit to compensate for the insufficient impedance adjustment of the SAW element in the pressure sensor. More details and all the advantages that can be achieved thereby are more closely explained in the following description of the accompanying drawings.

Figure 2:
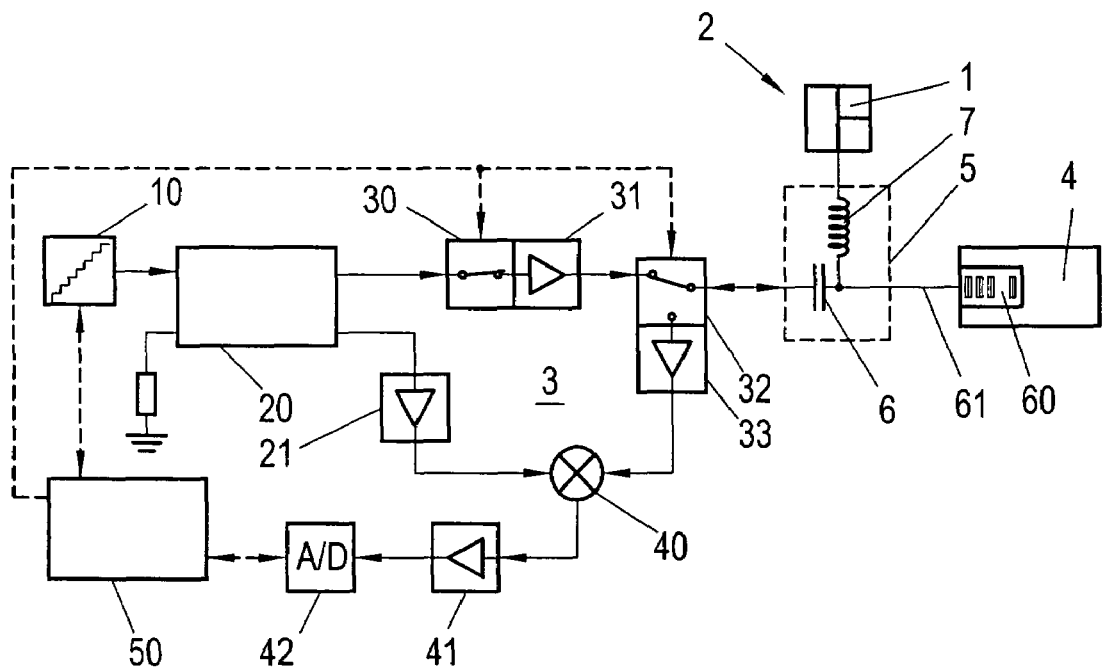

FIG. 1 shows the principal design of the measurement system of the aforementioned type according to the current state-of-the-art and FIG. 2 shows a corresponding arrangement according to the present invention.

FIG. 1 shows the principal design of a frequency stepped radar system (frequency stepped continuous wave radar, FSCW radar) according to the present state-of-the-art. The interrogation signals are produced by an external adjustable, frequency-stabilized HF transmitting module 10. A (small) amount of the signals are uncoupled in a HF coupler 20 for reference purposes and the rest of the excitation signal is fed to the SAW element 60 through the line 61. The coupling of the SAW element to the signal line may occur thereby through a galvanic connection, depending on its application, or also without contact through an electromagnetic near-field coupling. The electromagnetic wave is converted into an acoustic surface wave on the SAW element whereby said acoustic surface wave inter-reacts in sequence with the structures on the surface of the SAW element and it supplies a characteristic signal which contains the ID code and also a sensor value, for example. This signal is fed to a HF mixer through the line 61 and the HF coupler 20 whereby said HF mixer calculates a measurement signal from the reference signal and from the SAW signal which is transmitted in an amplified manner 41 and digitalized in an A/D transducer 42 to the control and analysis unit 50. According to the principle of the FSCW radar, this process is repeated for a number of different frequencies within the frequency band in a frequency range that is advantageous for the SAW element, typically in the MHz-GHz range, and the sensor response is reconstructed from the entire data.

A system of this type is cost-effective and it can be realized in a sufficiently compact design to be able to be integrated in an existing system control unit, for example. Reading devices based on this principle are very well suited for practical employment under the condition that the SAW signals differ sufficiently strong from the reflections, noise and other background effects. As mentioned above, this is not always guaranteed. An additional problem is thereby to be seen in the connection of the analysis unit 2 containing a load amplifier 1 since the interrogation unit 3 as well as the analysis unit 2 and the sensor 4 together with the integrated identification unit (SAW element 60) are connected via the connection cable or the signal line 61.

In the inventive arrangement according to FIG. 2 it is additionally proposed at first compared to FIG. 1 that the analysis unit 2 and the interrogation unit 3 are connected to the connection cable 61 via an interconnected common coupling unit 5. This coupling unit 5 is provided with at least a coupling capacity 6 and a coupling inductivity 7, which can be connected parallel to the signal line of the connection cable 61 whereby the interrogation unit 3 is coupled at high frequency to the signal line of the connection cable 61 by means of the coupling capacity 6. This results thereby in a very simple manner in the required separation of useful signals and identification signals as well as maintaining high ohms in the measurement sequence between the pressure sensor 4 and the input of the load amplifier 1.

According to FIG. 1, the known FSCW principle is expanded in its capability through the integration of two actively switched HF switch members, which use different running periods of interference signals and SAW usable signals to eliminate interference signals. The basis of this idea is that electromagnetic (interference) signals propagate at the speed of light in an electric conductor. In contrast, a surface acoustic wave has only a speed of about 3,000 m/s. This has the result that interference signal appear earlier at the end of the line or from reflection points while the mostly much weaker SAW usable signals are detected at a specific time delay.

A cost-effective and an especially advantageous principal technical solution is thereby illustrated in FIG. 2 for use in the present invention. A signal with a stable frequency is transmitted by the HF transmitting unit according to the state-of-the-art. A portion of this signal is separated as a reference signal by means of the HF coupler 20 whereby this portion can also be amplified through an amplifier 21. The main portion of the transmission signal passes a high frequency switch 30, or optional an amplifier stage 31, whereby the HF switch and the amplifier stage are arranged in a common component. A HF-capable transmitting/receiving switch 32 is supplied in the connection line 61 to the SAW element 60. The HF switch 30 is closed and the transmitting/receiving switch 32 is in the transmission position at the beginning of interrogation. After sending the signal over a certain period, the HF switch 21 is opened through a signal from the equipment control unit 50 whereby the "open" contacts are timely limited in this condition through resistors. After a system-dependent selectable time interval, the transmitting/receiving switch is switched back again through an active control signal of the equipment control 50. The time interval is selected thereby in such a manner that interference signals are received before the switch-over and usable signals from the SAW element are received after the switch-over. The usable signals separated in this manner from the interference signals are interconnected with the reference signal, according to the state-of-the-art, possibly after passing an amplifier stage 22 in a HF mixer 40, the resulting signal is amplified 41, digitalized 42 and further processed in the equipment control 50, e.g. a micro-controller or a digital signal processor (DSP). This process is repeated for each frequency stage. Low-noise stages with a fixed amplifier factor or low-noise amplifier stages with variable gain amplifier (VGA) may be selectively employed for different HF amplifier stages 21, 31, 33, 41.

The fading-out of most of the interference signals has a number of advantages. Aside of the general reduction of interferences, the signal amplifier for the useful signal 33 can be better adjusted to the weak SAW-generated signals. This means in the present case that the amplifier factor can be selected to be higher without having too many additional components. The employment of an amplifier with a variable gain factor is advantageous therefore especially for this amplifier to optimize the signal quality. An additional advantage of the described design is the fact that problems resulting from a not so ideal behavior of the HF components can be significantly reduced. This applies especially to the HF coupler 20. In a design according to the state-of-the-art and as illustrated in FIG. 1, the HF coupler 20 couples portions of the excitation signals in a relevant manner in the line as well, which supplies the useful signal to the HF mixer 40. This has the effect that the useful signals must be detected against a heightened signal background. The useful signals remain unaffected by the HF coupler 20 in the arrangement according to the invention. The HF isolation between transmitting signal and useful signal can be increased from the typical 20 dB to >40 dB through this effect whereby the signal background is reduced and the signal/noise ratio is improved.

The invention claimed is:

1. A measurement system in internal combustion engines comprising a plurality of exchangeable piezoelectric pressure sensors (4) which are different in their measuring characteristic and which are connected during operation via a connection cable (61) to an analysis unit (2) provided with an load amplifier (1) and whereby said pressure sensors are provided with integrated identification units having SAW (surface acoustic wave) elements (60) with identification units whose identification data can be read by an interrogation unit (3) via the connection cable (61) and whereby said interrogation unit contains an FSCW (frequency stepped continuous waver) radar unit, characterized in that the analysis unit (2) and the interrogation unit (3) can be connected by a common coupling unit (5) to the connection cable (61) and whereby the coupling unit (5) has a coupling capacity (6) and a coupling inductivity (7) which can be connected parallel to the signal line of the connection cable (61), whereby the interrogation unit (3) is coupled with high frequency to the signal line of the connection cable (61), while the load amplifier (1) of the analysis unit (2) is coupled with low frequency by means of the coupling inductivity (7) to the signal line of the connection cable (61).

2. A measurement system according to claim 1, wherein an SFSCW (switched frequency stepping continuous wave) radar unit is arranged in the interrogation unit (3) to compensate for the insufficient impedance adjustment of the SAW element (60) in the pressure sensor (4).

\* \* \* \* \*